No. 626,013. Patented May 30, 1899.
W. H. WALKER.
FLOWER HOLDER.
(Application filed Dec. 10, 1898.)

(No Model.)

WITNESSES
John Buckler,
F. A. Stuart

INVENTOR
William H. Walker,
BY
Edgar Tate & Co.
ATTORNEYS

UNITED STATES PATENT OFFICE.

WILLIAM HENRY WALKER, OF NEW YORK, N. Y.

FLOWER-HOLDER.

SPECIFICATION forming part of Letters Patent No. 626,013, dated May 30, 1899.

Application filed December 10, 1898. Serial No. 698,857. (No model.)

*To all whom it may concern:*

Be it known that I, WILLIAM HENRY WALKER, a subject of the Queen of Great Britain, residing at New York, (Brooklyn,) in the county of Kings and State of New York, have invented certain new and useful Improvements in Flower-Holders, of which the following is a full and complete specification, such as will enable those skilled in the art to which it appertains to make and use the same.

This invention relates to flower-holders; and the object thereof is to provide an improved device of this class which is simple in construction and which is designed to hold flowers arranged as a bouquet or so that the stems of the flowers may be inserted into a vase or other vessel containing water.

The invention is fully disclosed in the following specification, of which the accompanying drawings form a part, in which—

Figure 1:
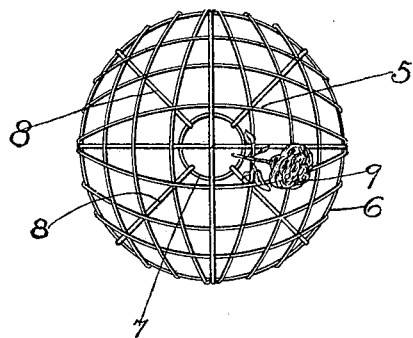
Figure 2:
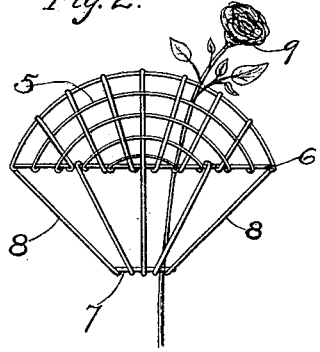

Figure 1 is a plan view of my improved flower-holder, and Fig. 2 a side view thereof.

In the drawings forming part of this specification the separate parts of my improvement are designated by the same numerals of reference in each of the views, and in the practice of my invention I provide a flower-holder which is of the form shown in the drawings and which comprises a top portion 5, which is circular in form at the base, as shown at 6, and which is composed of open wirework, said top portion 5 being preferably convex or segmental in cross-section. My improved flower-holder is also provided with a neck-ring 7, which is connected with the base 6 of the top portion by wires 8, and in practice the stems of the flowers, one of which is shown at 9, are passed downwardly through the top portion and through the neck-ring 7. It will be understood that the holder may be entirely filled with flowers in this manner, and the entire top portion thereof in this event would be concealed by the flowers, and the stems of the flowers, which project below the neck-ring 7, will constitute a handle for the bouquet.

This device may also be used in connection with a vase or other vessel for receiving water, and in this event the neck-ring is inserted into the top of the vase or other vessel and the holder proper rests thereon and the stems project down into the vessel.

Any desired style or form of open wirework may be provided for the top of the flower-holder, and it will be apparent that changes in and modifications of the construction described may be made without departing from the spirit of my invention or sacrificing its advantages.

Having fully described my invention, I claim as new and desire to secure by Letters Patent—

A flower-holder, comprising a convex top portion composed of open wirework, and a neck-ring connected with the base of said top portion by wires which extend from said base to said neck-ring, substantially as shown and described.

In testimony that I claim the foregoing as my invention I have signed my name, in presence of the subscribing witnesses, this 9th day of December, 1898.

WILLIAM HENRY WALKER.

Witnesses:
F. A. STEWART,
A. C. MCLOUGHLIN.